United States Patent

Narula et al.

[11] Patent Number: 6,139,813
[45] Date of Patent: Oct. 31, 2000

[54] NOX TRAPPING BY METAL-ZIRCONIA MATERIALS DURING LEAN-BURN AUTOMOTIVE ENGINE OPERATION

[75] Inventors: Chaitanya Kumar Narula; Sabine Rita Nakouzi-Phillips, both of Ann Arbor, Mich.

[73] Assignee: Ford Global Technologies, Inc., Dearborn, Mich.

[21] Appl. No.: 09/216,459

[22] Filed: Dec. 18, 1998

[51] Int. Cl.[7] .................................................. B01J 8/02
[52] U.S. Cl. ................................ 423/213.2; 423/213.5; 423/235; 423/239.1; 423/245.1; 423/246; 423/247; 423/248; 423/608; 423/635; 423/641
[58] Field of Search ........................ 423/213.2, 213.5, 423/239.1, 608, 635, 641, 235, 245.1, 246, 247, 248

[56] References Cited

U.S. PATENT DOCUMENTS

| 4,668,299 | 5/1987 | Namao et al. | 106/309 |
| 4,791,091 | 12/1988 | Bricker et al. | 502/303 |
| 4,902,655 | 2/1990 | Snyder et al. | 501/152 |
| 5,130,114 | 7/1992 | Igarashi | 423/652 |
| 5,200,384 | 4/1993 | Funabiki et al. | 502/304 |
| 5,403,513 | 4/1995 | Sato et al. | 252/309 |
| 5,403,807 | 4/1995 | Narula . | |
| 5,538,931 | 7/1996 | Heinrichs et al. | 502/234 |
| 5,766,562 | 6/1998 | Chattha et al. | 423/213.5 |

FOREIGN PATENT DOCUMENTS 0 613 714 A2   10/1994   European Pat. Off. .

*Primary Examiner*—Tom Dunn
*Assistant Examiner*—Cam N. Nguyen
*Attorney, Agent, or Firm*—Lorraine S. Melotik; Roger L. May

[57] ABSTRACT

The invention is a method for treating exhaust gas containing carbon monoxide, hydrocarbons, and nitrogen oxides generated by a lean burn internal combustion engine. It includes bringing the exhaust gas into contact with a particular metal-zirconium oxide material made by sol-gel processing and which includes at least 0.1 wt. % precious metal. The alkoxides include heterometallic alkoxides containing zirconium and alkali metal or alkaline earth metal. Optionally the oxide may contain a lanthanide metal. Under lean-burn conditions nitrogen oxides are absorbed on the oxide and when the oxygen concentration is lowered the absorbed nitrogen oxide are desorbed and reduced over the precious metal.

10 Claims, 1 Drawing Sheet

NOX TRAPPING BY METAL-ZIRCONIA MATERIALS DURING LEAN-BURN AUTOMOTIVE ENGINE OPERATION

Reference is made to commonly owned, related application Ser. No. 09/184,146 entitled "Use of Sol-Gel Processed Alumina-Based Metal Oxides for Absorbing Nitrogen Oxides in Oxidizing Exhaust Gas".

FIELD OF THE INVENTION

This invention is related to the use of sol-gel manufactured metal-zirconium oxide materials for trapping nitrogen oxides (NOx) during lean-burn engine operation.

BACKGROUND OF THE INVENTION

The treatment of automotive exhaust gas which includes hydrocarbons, carbon monoxide and nitrogen oxides continues to be the subject of research. Of particular current interest are lean-burn gasoline and diesel engines which operate with an A/F ratio which is higher than stoichiometry (oxidizing). Such systems provide improved fuel economy. Since the exhaust is oxidizing, nitrogen oxides which must be reduced pose the most difficulty for conversion. One current approach to treating oxidizing exhaust gasses involves providing NOx absorbents materials in the exhaust gas passage. These materials absorb nitrogen oxides from the exhaust gas during lean-burn operation and then later release them when the oxygen concentration in the exhaust gas is reduced. For example, when the A/F ratio is made rich or stoichiometric. Conventional NOx absorbents are alkaline earth metals like barium with a precious metal catalyst like platinum carried on alumina. The widely held mechanism for this absorption phenomena is that during lean-burn operation the platinum first oxidizes NO to $NO_2$ and the $NO_2$ subsequently forms a nitrate complex with the trapping material, e.g., the barium. In the regeneration mode, under a stoichiometric or rich environment, the nitrate decomposes and the NOx released is reduced catalytically over the platinum with reducing species like HC or CO in the exhaust gas.

Such conventional absorbent materials have a serious deficiency in that the barium reacts with sulfur oxides generally present in exhaust gas to form barium sulfate. This inactivates the barium for NOx absorption. It is suggested that to decompose the barium sulfate it should be subjected to elevated temperatures of at least 600° C. or more in reducing gas conditions. One negative aspect of this regeneration process is that it leads to detrimental changes in the NOx absorbent such as reduced surface area and crystallization of the aluminate phases thereby reducing the efficiency of the NOx absorbent. Alkali metals like potassium have also been suggested as NOx absorbents, however, they are even more easily deactivated by sulfur than alkaline earth metals like barium. Repeated regeneration of the absorbent by heating, as discussed above, contributes to a loss of surface area in the alumina support material and contributes toward further sintering in the platinum precious metal responsible for the conversion of NOx to $NO_2$. Precious metal sintering results in a decrease in the active sites that convert NOx to $NO_2$, and hence a decrease in the total amount of NOx trapped on the available absorbent. In commonly owned patent application entitled "Use of Sol-Gel Processed Alumina-Based Metal Oxides for Absorbing Nitrogen Oxides in Oxidizing Exhaust Gas", we disclose sol-gel processed alumina based oxides particularly those made from heterometallic alkoxides having excellent NOx trapping efficiency. Such oxides may be those of our U.S. Pat. No. 5,403,807 which are made from heterometallic alkoxides which contain aluminum and alkaline earths.

We have now found that zirconia based materials with alkali metal and/or alkaline earth metal made by sol-gel techniques using heterometallic alkoxides to incorporate the alkali metal and/or alkaline earth metal with the zirconium have excellent NOx trapping ability under diesel and gasoline lean burn-NOx conditions.

These materials have superior NOx trapping ability when compared to similar formulations made instead by impregnating the metal such as alkali metal onto conventional zirconia. These and other advantages of the present invention materials will be discussed in detail below.

In U.S. application Ser. No. 09/134,992 filed Aug. 17, 1998 and entitled "NOx Trap Catalyst For Lean Burn Engines" commonly assigned with the present invention, a sol-gel oxide material is disclosed useful for NOx absorption. It comprises oxides of aluminum, magnesium and zirconium.

SUMMARY OF THE INVENTION

The invention is a method for treating exhaust gas containing carbon monoxide, hydrocarbons, and nitrogen oxides generated by a lean-burn internal combustion engine. The method comprises the steps of: bringing the exhaust gas from the lean-burn engine in contact with a metal-zirconium oxide material made by sol-gel techniques which includes at least 0.1 wt. % precious metal selected from the group consisting of platinum, palladium, rhodium, and a mixture of any of them. The oxide material is made by sol-gel techniques from alkoxides including heterometallic alkoxide comprising: (I) at least one heterometallic alkoxide selected from the group consisting of:

(a) alkali metal-zirconium alkoxides having the general chemical formulas: $M[Zr(OR)_5]$, $M[Zr_2(OR)_9]$, $M_2[Zr_3(OR)_{14}]$, where M is an alkali metal;

(b) alkaline earth metal-zirconium alkoxides having the general chemical formulas: $M'[Zr_2(OR)_9]_2$ or $M'[Zr_3(OR)_4]$, where M' is an alkaline earth metal; and optionally, (II) lanthanide-zirconium alkoxides selected from the group consisting of: $Ln[Zr_2(OR)_9]_2$, where Ln is a lanthanide. In the invention method, under lean-burn conditions where the exhaust gas contains more oxygen than is required for oxidizing components to be oxidized in the exhaust gas, nitrogen oxides are absorbed on said oxide material and when the oxygen concentration in said gas is lowered the absorbed nitrogen oxides are desorbed and reduced over said precious metal.

DETAILED DESCRIPTION OF PREFERRED EMBODIMENTS

Figure 1:
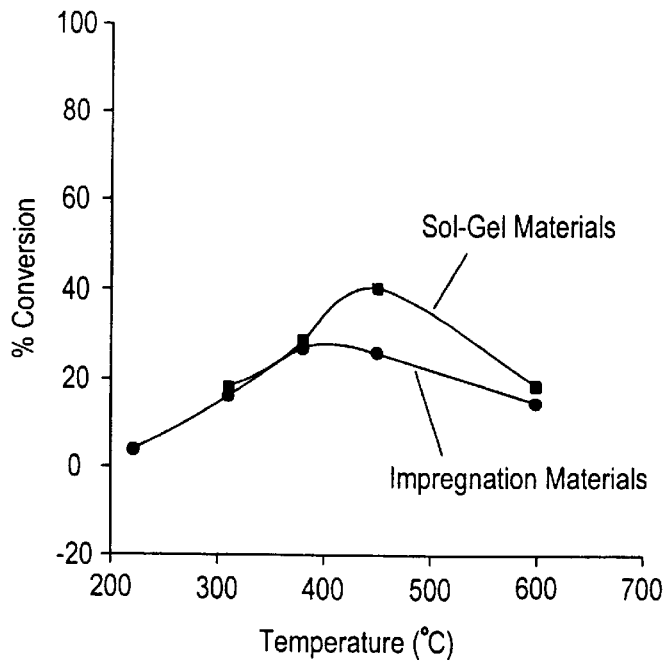
FIG. 1 is a graph showing higher NOx trapping efficiency of sol-gel materials prepared according to an embodiment of the present invention as compared with conventional (comparative example) impregnated materials.

As disclosed above, the invention is directed to the use of specific sol-gel processed metal-zirconia materials as a NOx absorbent in the exhaust passage of an internal combustion engine which operates at least for a time in lean-burn mode. Herein "lean-burn" comprises engines such as gasoline lean-burn engines and diesel engines, i.e., where the engine is operated under oxidizing conditions. Generally this means that the A/F ratio is above about 15.

The metal of the NOx absorbent material is alkali metal, alkaline earth metal or both of them. Optionally, the metal may be a lanthanide. The materials are made from alkoxides including heterometallic alkoxides which are defined above and will be discussed in more detail below. The method requires that the NOx absorbent include precious metal which would either be deposited on the material or included with the components during sol-gel processing. More particularly, the absorbent includes at least 0.1 wt. % precious metal selected from the group consisting of platinum, palladium, rhodium, and a mixture of any of them. Under lean-burn conditions, where the exhaust gas contains more oxygen than is required for oxidizing components to be oxidized in the exhaust gas, nitrogen oxides are absorbed on the metal oxide material and when the oxygen concentration in said gas is lowered the absorbed nitrogen oxides are desorbed from the metal oxide and reduced over the precious metal.

We have found that the invention NOx absorbent materials made by sol-gel techniques have improved properties as compared to a material made by merely loading metal, e.g., alkali metal, on conventional zirconia. In one aspect, the sol-gel processed materials are more resistant to sulfur poisoning. We believe this is because the sol-gel process offers a better distribution of alkali metals, alkaline earths, and lanthanides in zirconia than impregnation methods. Thus, the particle size of the oxides of alkali metals, alkaline earths and lanthanides remains small compared to impregnation method. This provides a larger number of reaction sites for the reaction of e.g., nitrogen in the exhaust gas with the oxides to oxidize the nitrogen for subsequent absorption. In another aspect they are more stable to temperature cycling as occurs during engine operation because, we believe, a better distribution of alkali metals, alkaline earths, and lanthanides in zirconia slows down the sintering of the NOx trap formulation. Sintering can lead to undesirable phase transformation of zirconia based materials into high temperature phases. This is accompanied with the loss of surface area. For precious metals, sintering involves thermally induced migration and coalescence of the noble metal particles which causes a decrease in surface to volume ratio leaving fewer catalytic atoms or molecules on the surface of the crystal available to the reactants. Further, because the product is made by sol-gel techniques the final product comprises oxides which are joined by chemical bonds to one other in the zirconia matrix. We believe this leads to the formation of high surface area zirconia materials with alkaline earth or lanthanide bonded to zirconium through oxygen. This prevents collapse of the pores in zirconia which results in the formation of zirconium-oxygen-zirconium bonds, since zirconium hydroxy bonds on the surface have been replaced with bonds with alkaline earths or lanthanides. However, neither the validity nor understanding of the theories discussed above are necessary for the practice of the invention.

The NOx absorbent material is disclosed in detail in concurrently filed and commonly owned patent application Ser. No. 09/216,179 entitled "Sol-Gel Processed Metal-Zirconia Materials", which is hereby expressly incorporated by reference for its teachings. The technique of making the sol-solutions is well known to those skilled in the art. In the case of using alkoxides, it generally involves (1) hydrolysis of metal alkoxides in water and/or parent alcohol (acid or base can be used as catalyst if necessary) or (2) modification of metal alkoxides with organics such as acetyl-acetone and subsequent hydrolysis or (3) direct hydrolysis in water and peptization in the presence of acid.

The novel invention materials are made from alkoxides including certain heterometallic alkoxides. The heterometallic alkoxides contain zirconium and another metal being alkali metal, alkaline earth metal or lanthanide metal.

In making the material, lanthanide-zirconium heterometallic alkoxides are optional, however, at least one heterometallic alkoxide selected from the group consisting of: (a) alkali metal-zirconium alkoxides having the general chemical formulas: $M[Zr(OR)_5]$, $M[Zr_2(OR)_9]$, $M_2[Zr_3(OR)_{14}]$, where M is an alkali metal; (b) alkaline earth metal-zirconium alkoxides having the general chemical formulas: $M'[Zr_2(OR)_9]_2$ or $M'[Zr_3(OR)_{14}]$, where M' is an alkaline earth metal is employed. Lanthanide-zirconium alkoxides optionally employed are selected from the group consisting of: $Ln[Zr_2(OR)_9]_2$, where Ln is a lanthanide. The ratio of alkali metals, alkaline earth metals, and/or lanthanide to zirconia can be changed by including varying amounts of mono-metal alkoxides such as zirconium alkoxide, alkali metal alkoxide, alkaline earth metal alkoxide, or lanthanide alkoxide with the heterometallic alkoxide.

Alkali metal is meant to include such metals as lithium (Li), sodium (Na), potassium (K), rubidium (Rb), and cesium (Cs). Alkaline earth metal is meant to include such metals as magnesium (Mg), calcium (Ca), strontium (Sr), and barium (Ba). Lanthanide is meant to include members of the lanthanide series of the Periodic Table such as lanthanum (La) and cerium (Ce). As would be apparent to one skilled in the art in view of the present disclosure, more than one such heterometallic alkoxide could be employed. That is, e.g., lithium-zirconium alkoxide and barium-zirconium alkoxide could be employed.

In the final oxide material, (a) zirconium oxide and (b) the total of alkali metal oxide and/or alkaline earth metal oxide, are preferably present in weight percents respectively of (a) 20–80 wt % and (b) 80–20 wt. %. When lanthanum oxide is present, it is included in 10–50 wt. % (based on a total of 100 wt. % of these three oxides in the product). More preferably, in the product oxide, these weight percents are 87–40 wt. %, 3–30 wt. %, and 10–30 wt. % of these three oxides, respectively.

Advantageously, in these materials, the metal like alkali metal, for example, is seen to be uniformly distributed throughout the zirconia matrix and chemically linked into the zirconia by bridges such as metal-oxygen-zirconium or metal-hydroxide-zirconium. Also we found that these material from heterometallic alkoxides have a higher surface area than materials conventionally made from mixtures of oxides like zirconium oxide, alkali metal oxide, and optionally lanthanum oxide or their precursors, e.g., nitrates, chlorides, etc. This increased surface area is advantageous, e.g., when the material is NOx absorption. More specifically, the special advantages for NOx absorption of using heterometallic alkoxides is believed by the inventors to be the result of the molecular distribution of alkali metals, alkaline earths and lanthanides in an zirconia matrix. Such distribution further improves the thermal stability of sol-gel processed materials as compared with those prepared from a mixture of mono-metallic alkoxides.

In its broadest embodiment, the product metal-zirconia materials are made by reacting water and alkoxides, which sol-gel techniques are described in detail in U.S. Pat. No. 5,403,807 incorporated expressly herein by reference. Using such techniques, for example, a barium-zirconium-oxide material according to the present invention can be made from alkoxides including Ba[Zr$_2$(OR)$_2$]$_2$ and water. As with any such material made according to the present invention, the ratio of alkali metals, alkaline-earth metals and/or lanthanide to zirconia can be changed by including varying amounts of one or more mono-metal alkoxides like zirconium alkoxide, alkaline earth alkoxides, alkali metal alkoxide, and lanthanide alkoxides with the heterometallic alkoxide. Thus the ratio of, e.g., Ba to zirconia is changed, according to the above example, by mixing Zr(OPr$^i$)$_3$ with-Ba[Zr$_2$(OPr$^i$)$_9$]$_2$ A barium lanthanum-zirconia, e.g., may be prepared from a mixture of Ba[Zr$_2$(OPr$^i$)$_9$]$_2$, La(OR)$_3$ and Zr(OR)$^4$.

Sol-gel technology is widely known and most commonly comprises reacting water and an alkoxide having hydrolyzable alkoxy groups. Any such technology may be used to make the preferred materials. Preferred sol-gel methods for making the novel metal zirconia materials according to the present invention are detailed below Still others considered within the scope of the invention will be apparent to those skilled in the art in view of the present disclosure.

In one embodiment of the present invention for forming metal-zirconia materials, an alkali metal-zirconium oxide material is formed from a heterometallic alkoxide including the steps of forming a reaction mixture from M'[Zr$_2$(OPr$^i$)$_9$], M'=Li, Na, K, and water, maintaining the reaction mixture at elevated temperature, removing isopropanol and water from the reaction mixture, and collecting the xerogel. According to another embodiment of the present invention, an alkali metal-alkaline earth-zirconium oxide material is formed from heterometallic alkoxides including the steps of forming a reaction mixture with the alkoxides and water, maintaining the reaction mixture at elevated temperature, removing alcohol and water from the reaction mixture, and collecting the produced xerogel.

The metal-zirconium oxide material may include minor proportions of other materials to stabilize or otherwise enhance the oxide properties. Stabilizer materials such as silica commonly included in oxide materials to be used at elevated temperatures would also be useful herein. When included they would be used in an amount up to about 10 wt. % based on the total weight of the zirconia-based metal oxide.

For use in absorbing NOx, as disclosed above the oxide material would include a precious metal like platinum, palladium, or rhodium or a mixture of any of them. The precious metal can be loaded on the oxide material or incorporated within the sol-gel material during processing. For example, incipient wetness techniques may be used where the oxide material can be contacted with, e.g., hexachloroplatinic acid solution to deposit platinum. The impregnated product would be dried and calcined generally before use. Alternately, the platinum could be included in the sol as, e.g., platinum 2-ethyl hexanoate. In this case, rather than the platinum being merely loaded on the metal oxide it would be included within the metal oxide.

The precious metal included in the zirconia-based metal oxide is incorporated in an amount of at least 0.1 wt. % based on the total weight of the oxide metal-zirconium oxide material. Preferably, the precious metal is employed in an amount of 0.1 to 5 wt. % based on the weight of the oxide, more preferably being included in about 1 to 2 wt. %. For wet impregnation, as one example, the precious metal may be provided from soluble precious metal compounds. Water soluble compounds are preferred, including, but not limited to nitrate salts. In addition to this incorporation from a liquid phase, the precious metal, e.g., platinum, may be provided by sublimation of platinum chloride or other volatile platinum salts: by solid state exchange in the 300–500° C. temperature range using labile platinum compounds. Platinum is the preferred precious metal, however, when platinum is included other precious metal like rhodium in relatively small amounts is desirably also added, optimally as 1–5 wt. % rhodium based on the weight of the support. Rhodium is desirably included since it provides a broadening of the NOx conversion window due to increased conversion efficiency of nitrogen oxides at higher temperatures.

For useful application as a catalyst support, or as a NOx absorbent material in an exhaust system as disclosed herein, a coating of this material will be carried on a substrate (mechanical carrier) of a high temperature stable, electrically insulating material such as cordierite, mullite, etc. A mechanical carrier is preferably comprised of a monolithic magnesium aluminum silicate structure (i.e., cordierite), although the configuration is not critical to the absorbent/catalyst of this invention. It is preferred that the surface area of the monolithic structure provide 50–100 meter square per liter structure, as measured by N$_2$ adsorption. Cell density should be maximized consistent with pressure drop limitations and is preferably in the range of 200–800 cells per square inch of cross-sectional area of the structure. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

A washcoat of the material (without the precious metal) may be applied to the substrate and then impregnated with the precursor precious metal solution, if desired. Alternately, the material with precious metal may be washcoated onto the substrate by forming a slurry thereof. Generally, the oxide is provided first on the substrate and then impregnated with a precious metal precursor. Still other ways of providing the invention material for use will be apparent to those skilled in the art in view of the present disclosure, the method not being critical to the present invention. Generally, for use in an exhaust system this impregnated washcoat is subjected to elevated temperatures to decompose and eliminate the functional group of the precious metal precursor. It may be further subjected to calcining. Optimally, the substrate carries a washcoat of the final oxide material in an amount of between about 20% and 40% by weight based on the weight of the substrate (e.g., monolith).

If the material is placed in use in an exhaust gas conduit, oxygen present in the exhaust gas will oxidize any precious metal like platinum to platinum oxide which at high temperatures decomposes to platinum and oxygen. Thus it often exists as a mixture of platinum and its oxides.

The method of absorbing NOx according to the present invention may be comprised of the step of placing another catalyst device as, for example, a catalytic converter employing a conventional three-way catalyst containing palladium, etc., or a lean-burn catalyst such as one containing transition metals like silver, copper, etc. in the exhaust gas passage. The three-way catalyst, for example, can be placed upstream of the NOx absorbent, hence closer to the engine. In such an arrangement, the three-way catalyst being preferably closely mounted to the engine would warm up quickly and provide for efficient engine cold start emission control. The NOx absorbent would be positioned downstream of the three-way catalyst where the lower exhaust gas temperature enables maximum NOx absorption efficiency. The lean-burn catalyst, if employed may be placed before or after the invention NOx absorbent depending on the NOx removal strategy.

As discussed above, during periods of lean-burn engine operation when NOx passes through the three-way catalyst, NOx is stored on the absorbent. The NOx absorbent is periodically regenerated by short periods or intervals of slightly rich engine operation. Thus, the stored NOx is then released (purged) from the trapping material and is catalytically reduced over a precious metal like platinum in the absorbent material by the excess hydrocarbons and other reductants like CO and $H_2$ present in the exhaust gas. In general, the released NOx is efficiently converted to $N_2$ and $CO_2$ which efficiency is enhanced when rhodium is contained within the NOx absorbent washcoat. However, one may wish to place a second three way catalyst downstream of the NOx absorbent in order to further aid in this regard. As disclosed above, the invention NOx absorbent may be used for gasoline engines where during lean-burn operation the air/fuel ratio is usually in the range 19–27. In addition, the invention NOx absorbent may be used for diesel engines which also operate in lean-burn conditions. In order to provide the more reducing atmosphere, materials like urea and hydrocarbons, as from diesel fuel, may be injected into the absorbent or into the absorbent stream entering the absorbent to provide for the regeneration of the absorbent.

The powders prepared according to Examples 1–7 are tested to evaluate improvements in catalystic trapping efficiency, thermal stability, and durability. Platinum is loaded onto the powders at 1–2% by weight, and alpha-alumina is used as a diluent in order to simulate realistic honeycomb substrate space velocity conditions. The inpput gas flow comprises 500 ppm NO, 7,500 ppm CO, 6% $O_2$, 10% $CO_2$, 10% water, 40 ppm HC 3:1 (C3H6:C3H8), 2,500 ppm H2 and 1,377 cc/min. N2. The space velocity of gas flow is 25,000hr–1. A lean-burn NOx trapping protocol alternating 1 minute rich and lean condition is used to establish the optimum lean trapping temperature and efficiency.

EXAMPLE 1

$Ba[Zr_2(O^iPr)_9]_2$ according to an embodiment of the present invention method is prepared by heating a suspension of barium metal (0.537 g) and zirconium isopropoxide (6.06 g) in isopropanol under reflux till all of the barium metal dissolves. The resulting $Ba[Zr_2(O^iPr)_9]_2$(6.60) is mixed with $Zr(OR)_4.ROH$ (1.49) and added to 80 ml water at 80° C. with stirring. A gel forms immediately. The volatiles are removed by evaporation at 90° C. to obtain $BaO.nZrO_2$ Xerogel. The BET surface area of the powder is 62 $m^2/g$ and the BJH pore diameter is 4.5 nm. The material is 20% BaO. This materials exhibits a NOx trapping efficiency of 40.7% at 450° C. as shown in FIG. 1.

EXAMPLE 2

Figure 2:
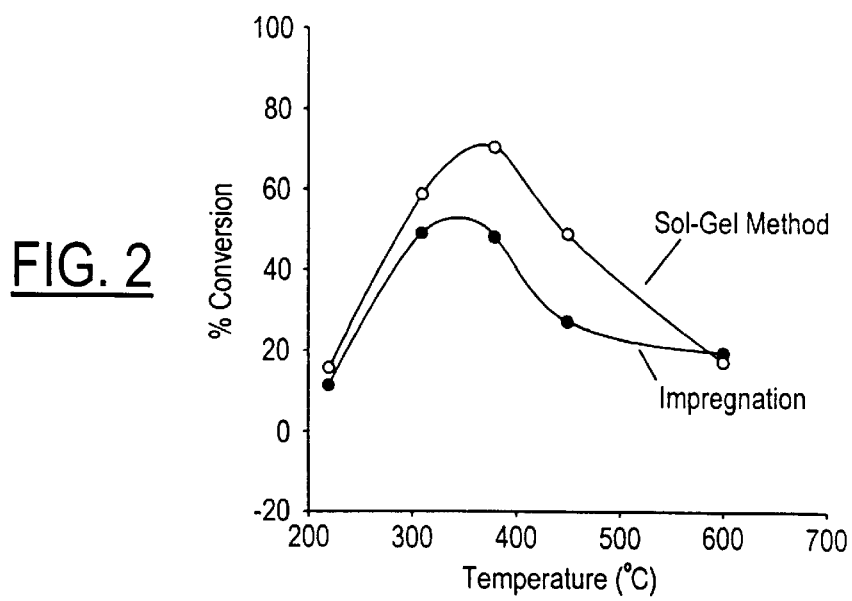
FIG. 2 is a graph showing NOx trapping efficiency of sol-gel materials prepared according to an embodiment of this invention as compared with conventional (comparative example) impregnated materials.

$Ba[Zr_2(O^iPr)_9]_2$ according to an embodiment of the present invention method is prepared by heating a suspension of barium metal (0.269 g) and zirconium isopropoxide (3.04 g) in isopropanol under reflux till all of the barium metal dissolves. The resulting $Ba[Zr_2(O^iPr)_9]_2$ 3.07) is mixed with $Zr(OR)_4.ROH$ (5.45) and added to 80 ml water at 80° C. with stirring. A gel forms immediately. The volatiles are removed by evaporation at 90° C. to obtain $BaO.nZrO_2$ Xerogel. The BET surface area of the powder is 165 $m^2/g$ and the BJH pore diameter is 8.6 nm. It is 10% BaO. This materials exhibits a NOx trapping efficiency of 70.6% at 380° C. as shown in FIG. 2.

EXAMPLE 3

Figure 3:
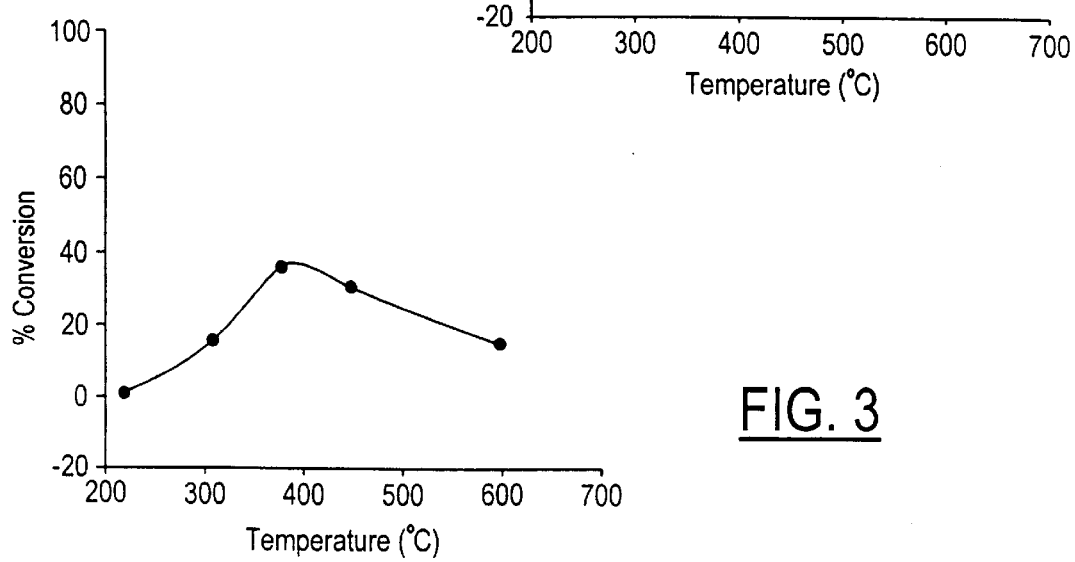
FIG. 3 is a graph showing NOx trapping efficiency of sol-gel materials prepared according to an embodiment of this invention as compared with conventional (comparative example) impregnated materials.

$Li[Zr_2(O^iPr)_9]$ according to an embodiment of the present invention is prepared by heating a suspension of lithium metal (0.076 g) and zirconium isopropoxide (8.491 g) in isopropanol under reflux till all of the lithium metal dissolved. The resulting $Li[Zr_2(O^iPr)_9]$ (7.89 g) is mixed with $LiO^iPr$ (0.6 g) and added to 80 ml water at 80° C. with stirring. A gel forms immediately. The volatiles are removed by evaporation at 90° C. to obtain $Li_2O.nZrO_2$ Xerogel. The BET surface area of the powder is 36.3 $m^2/g$ and the BJH pore diameter is 28.4 nm. It is 5% $Li_2O$. This materials exhibits a NOx trapping efficiency of 36.4% at 380° C. as shown in FIG. 3.

EXAMPLE 4

A solution of $Ba(O^iPr)_2$ (1.02 g), $Li(O^iPr)$ (5.58 g), $LiZr_2(O^iPr)_9$ (1.43 g) and $Ce(O^iPr)_4$(1.7 g) is suspended in isopropanol and heated under reflux. The resulting mixture is added to 70 ml of water at 80° C. The volatiles are allowed to evaporate and the residual powder is collected and pyrolyzed at 600° C. This materials exhibits a NOx trapping efficiency of 29.8% at 450° C.

The following examples are described for comparison only and are not made according to the present invention.

EXAMPLE 5

Commercial zirconium oxide (2.4 g) is suspended in a solution of barium nitrate (1.02 g). The resulting suspension is carefully dried and fired at 600° C. This materials exhibits a NOx trapping efficiency of 26.2% at 450° C. as shown in FIG. 1. The $BaO:ZrO_2$ ratio of this example material is identical to that of the material described in Example 1.

EXAMPLE 6

Commercial zirconium oxide (2.7 g) is suspended in a solution of barium nitrate (0.511 g). The resulting suspension is carefully dried and fired at 900° C. The BET surface area of the powder is 16.2 $m^2/g$ and the BJH pore diameter is 9.86 nm. This materials exhibits a NOx trapping efficiency of 48% at 380° C. as shown in FIG. 2. The $BaO:ZrO_2$ ratio is identical to that of the Example 2 material.

EXAMPLE 7

Commercial zirconium oxide (2.7 g) is suspended in a solution of lithium nitrate (1.384 g). The resulting suspension is carefully dried and fired at 900° C. This materials exhibits a NOx trapping efficiency of 35.8% at 380° C. The BET surface area of the powder is 2.6 $m^2/g$ and the BJH pore diameter is 8.9 nm. The $Li_2O:ZrO_2$ ratio of this example is identical to that of the material in Example 3.

We claim:

1. A method for treating exhaust gas containing carbon monoxide, hydrocarbons, and nitrogen oxides generated by a lean-burn internal combustion engine, the method comprising the step of:

bringing said exhaust gas from said lean-burn engine in contact with a metal-zirconium oxide material made by sol-gel techniques which includes at least 0.1 wt. % precious metal selected from the group consisting of platinum, palladium, rhodium, and a mixture of any of them, said metal-zirconium oxide material made by sol-gel techniques, the material comprising: at least one heterometallic alkoxide selected from the group consisting of:
(a) alkali metal-zirconium alkoxides having the general chemical formulas: $M[Zr(OR)_5]$, $M[Zr_2(OR)_9]$, $M_2[Zr_3(OR)_{14}]$, where M is an alkali metal; and
(b) alkaline earth metal-zirconium alkoxides having the general chemical formulas: $M'[Zr_2(OR)_9]_2$ or $M'[Zr_3(OR)_{14}]$, where M' is an alkaline earth metal, wherein under lean-burn conditions, where said exhaust gas contains more oxygen than is required for oxidizing components to be oxidized in the exhaust gas, nitrogen oxides are absorbed on said oxide material and when the oxygen concentration in said gas is lowered the absorbed nitrogen oxides are desorbed and reduced over said precious metal.

2. The method according to claim 1 wherein said oxide material includes 20–80 wt. % zirconium oxides and 80–20 wt. % of the total of alkai metal oxides and alkaline earth metal oxides.

3. The method according to claim 2 wherein said oxide includes 10–50 wt. % oxides of a lanthanide.

4. The method according to claim 1 wherein said alkali metal is selected from the group consisting of lithium, potassium, sodium, cesium, and a mixture of any of them.

5. The method according to claim 1 wherein said alkaline earth metal is selected from the group consisting of calcium, barium, strontium, magnesium, and a mixture of any of them.

6. The method according to claim 1 wherein said lanthanide is selected from the group consisting of lanthanum, cerium, and their mixture.

7. The method according to claim 1 wherein said precious metal is either included during sol-gel processing of said oxide or loaded on the oxide.

8. The method according to claim 1 wherein said precious metal is present in an amount of 1–5 wt. % based on the weight of the oxide.

9. The method according to claim 1 which further comprises placing a three-way catalyst either upstream or downstream of the metal-zirconium oxide absorbent.

10. The method according to claim 1 further comprising lanthanide-zirconium alkoxides selected from the group consisting of: $Ln[Zr_2(OR)_9]_2$, where Ln is a lanthanide.

\* \* \* \* \*